(12) United States Patent
Blumenschein et al.

(10) Patent No.: US 9,590,340 B2
(45) Date of Patent: Mar. 7, 2017

(54) ELECTRICAL PLUG TYPE CONNECTOR HAVING A MICROSTRUCTURED CONTACT ELEMENT

(71) Applicant: Tyco Electronics AMP GmbH, Bensheim (DE)

(72) Inventors: Rudi Blumenschein, Ellwangen (DE); Helge Schmidt, Speyer (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 14/365,488

(22) PCT Filed: Dec. 5, 2012

(86) PCT No.: PCT/EP2012/074544
§ 371 (c)(1),
(2) Date: Jun. 13, 2014

(87) PCT Pub. No.: WO2013/087487
PCT Pub. Date: Jun. 20, 2013

(65) Prior Publication Data
US 2015/0004853 A1    Jan. 1, 2015

(30) Foreign Application Priority Data
Dec. 16, 2011   (DE) .................. 10 2011 088 793

(51) Int. Cl.
*H01R 13/03*   (2006.01)
*B32B 15/01*   (2006.01)
*H01R 13/05*   (2006.01)

(52) U.S. Cl.
CPC ............. *H01R 13/03* (2013.01); *B32B 15/01* (2013.01); *B32B 15/018* (2013.01); *H01R 13/05* (2013.01)

(58) Field of Classification Search
USPC ........... 439/887, 886, 882, 883; 29/870, 874
See application file for complete search history.

(56) References Cited

U.S. PATENT DOCUMENTS

| | | | |
|---|---|---|---|
| 5,766,776 A | 6/1998 | Buresch | |
| 6,554,648 B2* | 4/2003 | Shi et al. | 439/607.55 |
| 6,863,999 B1* | 3/2005 | Sudre et al. | 428/704 |
| 7,131,856 B2* | 11/2006 | Hoisington et al. | 439/411 |
| 8,053,693 B2* | 11/2011 | Bertram et al. | 200/246 |
| 9,112,312 B2* | 8/2015 | Katayanagi | |
| 2001/0055697 A1 | 12/2001 | Schleicher et al. | |
| 2002/0096662 A1 | 7/2002 | Schleicher et al. | |

(Continued)

FOREIGN PATENT DOCUMENTS

| | | |
|---|---|---|
| EP | 2148394 A2 | 1/2010 |
| WO | WO 2011/098256 A2 | 8/2011 |

OTHER PUBLICATIONS

International Preliminary Report on Patentability issued by the International Bureau of WIPO, Geneva, Switzerland, dated Jun. 17, 2014 for International Application No. PCT/EP/2012/074544; 8 pages.

(Continued)

*Primary Examiner* — Alexander Gilman
(74) *Attorney, Agent, or Firm* — Faegre Baker Daniels LLP

(57) ABSTRACT

In an electrical plug type connector having an electrically conductive contact element having a contact surface, the contact surface has a microstructure.

12 Claims, 3 Drawing Sheets

(56) References Cited

U.S. PATENT DOCUMENTS

| | | |
|---|---|---|
| 2004/0241403 A1 | 12/2004 | Rehbein |
| 2004/0248421 A1* | 12/2004 | Yorita et al. ............... 438/719 |
| 2006/0105641 A1 | 5/2006 | Rehbein et al. |
| 2006/0148339 A1* | 7/2006 | Kaspar et al. ............... 439/886 |
| 2006/0163047 A1* | 7/2006 | Rehbein et al. ............. 200/262 |
| 2006/0204741 A1* | 9/2006 | Rehbein et al. ........... 428/304.4 |
| 2007/0284255 A1* | 12/2007 | Gorokhovsky et al. ........ 205/89 |
| 2010/0204443 A1* | 8/2010 | Gazit et al. .................. 530/300 |
| 2010/0258651 A1 | 10/2010 | Tekoral et al. |
| 2011/0100957 A1* | 5/2011 | Moran et al. ................. 216/100 |
| 2011/0111182 A1* | 5/2011 | Stay et al. .................... 428/173 |
| 2012/0301740 A1 | 11/2012 | Buresch et al. |
| 2013/0029093 A1* | 1/2013 | Wakioka ....................... 428/131 |
| 2015/0004853 A1* | 1/2015 | Blumenschein et al. ..... 439/887 |

OTHER PUBLICATIONS

International Search Report and Written Opinion issued by the European Patent Office, dated May 19, 2014, for related International Application No. PCT/EP2012/074544; 12 pages.

English translation of Examination Report dated Feb. 6, 2016, issued by the State Intellectual Property Office of the People's Republic of China for Chinese Patent Application No. 201280062221.0; 8 pages.

* cited by examiner

ELECTRICAL PLUG TYPE CONNECTOR HAVING A MICROSTRUCTURED CONTACT ELEMENT

BACKGROUND

The present invention relates to an electrical plug type connector.

A large number of constructions of electrical plug type connectors are known in the prior art. Electrical plug type connectors are provided to be connected to a suitable plug type connector mating piece in order to produce an electrical connection. Electrical plug type connectors generally have electrically conductive contact elements which come into contact with contact elements of the plug type connector mating piece when the plug type connector is connected to a plug type connector mating piece. The contact elements of the plug type connector are often constructed as contact pins and the contact elements of the plug type connector mating piece are constructed as contact springs. In the connected state of the plug type connector and plug type connector mating piece, the contact springs apply resilient forces to the contact pins in order to ensure a reliable, electrically conductive connection between the contact spring and the contact pin.

Contact elements of known electrical plug type connectors often have tin-coated contact surfaces. During the first connection of a plug type connector to a plug type connector mating piece, owing to the resilient force applied to the contact pin by the contact spring, the tin is often partially rubbed away from the tin-coated surface. This has the disadvantage that significant insertion forces have to be applied in order to connect the plug type connector to the plug type connector mating piece. In addition, a change of one or both contact surfaces brought about by the abrasion may accompany an undesirable increase of transition resistance between the contact elements.

SUMMARY

An object of the present invention is therefore to provide an improved electrical plug type connector. This object is achieved by a plug type connector having the features of claim 1. Preferred developments are set out in the dependent claims.

An electrical plug type connector according to the invention has an electrically conductive contact element having a contact surface. In this instance, the contact surface has a microstructure. A support face between the contact surface of the contact element and a contact surface of a contact element of a plug type connector mating piece is advantageously reduced by the microstructure when the plug type connector is connected to the plug type connector mating piece. Friction forces acting between the contact surfaces are thereby reduced, which advantageously involves a reduction of the insertion forces required for connection of the plug type connector to the plug type connector mating piece. The reduction of the support face between the contact surfaces at the same time involves a multiplication of the contact locations between the contact surfaces, which advantageously brings about a reduction of the electrical transition resistance between the contact surfaces. Another advantage of the plug type connector according to the invention is that abrasion of the contact surface is reduced by the microstructuring.

In an advantageous embodiment of the electrical plug type connector, the contact surface has tin or silver or an alloy of tin or silver. Tin, silver and the alloys thereof advantageously have favourable electrical and mechanical properties, whereby a resistant contact surface is produced.

In a preferred embodiment of the electrical plug type connector, the contact element comprises copper or a copper alloy and is tin-coated or silver-coated or coated with a tin/silver alloy. Advantageously, the contact element then has a low ohmic resistance. Furthermore, there are advantageously formed, during the tin-coating or silver-coating operation or coating operation of the contact element comprising copper or a copper alloy, hard intermetallic phases which are partially brought to the surface of the contact surface during the microstructuring of the contact element, whereby a contact element of a plug type connector mating piece can more readily slide over the contact surface of the contact element.

In one embodiment of the electrical plug type connector, the contact surface has projections and recesses. Advantageously, the support face between the contact surface of the contact element of the plug type connector and a contact surface of a contact element of a plug type connector mating piece is thereby reduced.

In a development of the electrical plug type connector, a lubricant is arranged in at least one recess. Owing to the provision of a lubricant in one or more recesses of the contact surface, the insertion forces required to connect the plug type connector to a plug type connector mating piece are advantageously additionally reduced.

In an embodiment of the electrical plug type connector, the microstructure forms an at least partially periodic structure. Advantageously, the microstructure can then be produced in a simple manner and has reproducible properties.

In a preferred embodiment of the electrical plug type connector, the periodic structure has in at least one direction a periodic length in the range between 1 µm and 100 µm. Advantageously, experiments have shown that periodic structures of this order of magnitude bring about a particularly clear improvement of the mechanical and electrical properties of the contact surface. In a particularly preferred embodiment, the periodic length is in the range between 2 µm and 30 µm, preferably in the range of approximately 10 µm. The size of approximately 10 µm has been found to be favourable in experiments.

In one embodiment of the electrical plug type connector, the microstructure has a scale-like structure. It has advantageously been found that a scale-like structure constitutes a microstructure which is suitable for improvement of the electrical and mechanical properties of the contact surface.

In a preferred embodiment of the electrical plug type connector, the microstructure is produced by means of a laser or electron beam processing operation of the contact surface. Advantageously, using a laser or electron beam processing operation, extensive contact surface-areas can be microstructured in a precise and reproducible manner within an extremely short period of time.

In one embodiment of the electrical plug type connector, the contact element is a contact pin. Advantageously, a microstructuring of the contact surface of a contact pin is particularly effective since the contact pin of the plug type connector mating piece slides over a wide region of the contact surface of the contact pin during connection.

In another embodiment of the electrical plug type connector, the contact element is a contact spring. Advantageously, a microstructuring of the contact surface of a contact spring also brings about an improvement of the mechanical and electrical properties of the contact spring.

In a development of the electrical plug type connector, it has a plurality of contact elements. Advantageously, the reduction of the insertion forces brought about by the microstructuring of the contact surfaces of the contact elements is then particularly substantial since the insertion force required to connect the plug type connector and plug type connector mating piece changes in accordance with the number of the contact elements to be connected.

BRIEF DESCRIPTION OF THE DRAWINGS

The invention is explained in greater detail below with reference to Figures, in which.

DETAILED DESCRIPTION

Figure 1:
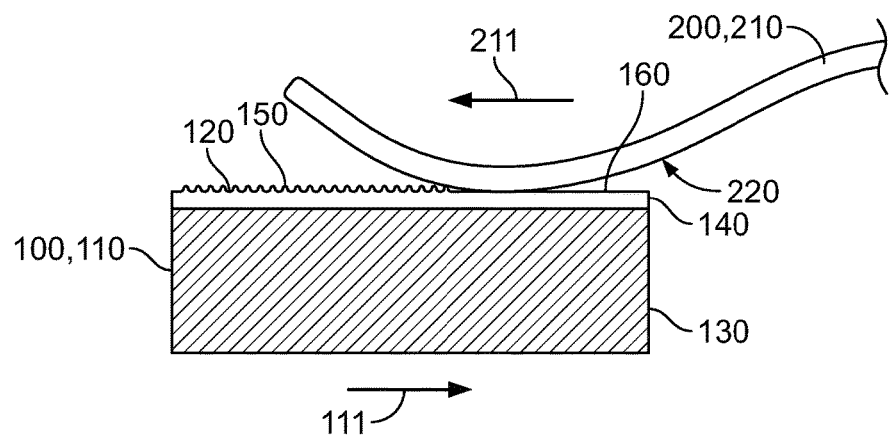
FIG. 1 is a schematic view of a contact pin and a contact spring during connection of two plug type connectors.

FIG. 1 is a highly schematic and partially sectioned illustration of components of two plug type connectors during connection of these plug type connectors.

FIG. 1 shows a first contact element 110 of a first plug type connector 100. The first contact element 110 is constructed as a contact pin and is illustrated in a sectioned manner in FIG. 1. The first contact element 110 is electrically conductive and comprises a base material 130 and a coating 140 which is arranged on a surface of the base material 130. The base material 130 may, for example, be copper or a copper alloy. The coating 140 may, for example, have tin, silver or alloys of tin, silver and/or other elements. The coating 140 may, for example, have been applied to the base material 130 by means of hot-dip tinning. A surface of the coating 140 directed away from the base material 130 forms a first contact surface 120.

FIG. 1 further shows a portion of a second contact element 210 of a second plug type connector 200. The second plug type connector 200 is constructed as a plug type connector mating piece with respect to the first plug type connector 100 and is provided to be connected to the first plug type connector 100. The second contact element 210 has a second contact surface 220 which comes into contact with the first contact surface 120 when the first plug type connector 100 and the second plug type connector 200 are connected. The second contact element 210 of the second plug type connector 200 is constructed as a contact spring and can be resiliently deformed within limits.

If the first plug type connector 100 and the second plug type connector 200 are connected, as illustrated in FIG. 1, the second contact element 210 of the second plug type connector 200 touches the first contact element 110 of the first plug type connector 100 in order to produce an electrically conductive connection between the first contact element 110 and the second contact element 210. During the connection of the first plug type connector 100 and the second plug type connector 200, the first contact element 110 of the first plug type connector 100 moves relative to the second contact element 210 of the second plug type connector 200 in a first relative insertion direction 111. The second contact element 210 of the second plug type connector 200 moves relative to the first contact element 110 of the first plug type connector 100 in a second relative insertion direction 211, which is orientated in the opposite direction to the first relative insertion direction 111.

Owing to the pressing force applied to the first contact surface 120 of the first contact element 110 by the second contact surface 220 of the second contact element 210, friction forces act between the first contact surface 120 and the second contact surface 220 and must be overcome while the first plug type connector 100 and the second plug type connector 200 are being connected. In order to reduce this insertion force required to connect the plug type connectors 100, 200 with respect to conventional plug type connectors, the first contact surface 120 of the first contact element 110 of the first plug type connector 100 has a microstructure 150 which is explained in greater detail below. The microstructure 150 is produced by means of microstructuring of the first contact surface 120. During the connection of the plug type connectors 100, 200, the microstructure 150 on the first contact surface 120 is partially levelled by the second contact element 210 sliding along the first contact surface 120 so that, after the plug type connectors 100, 200 have been connected, a partially levelled microstructure 160 remains.

In an alternative embodiment, the second contact surface 220 of the second contact element 210 of the second plug type connector 200 could also be provided with a microstructure. In this embodiment, the first contact surface 120 of the first contact element 110 of the first plug type connector 100 may also be provided with the microstructure 150. However, the microstructure 150 on the first contact surface 120 of the first contact element 110 of the first plug type connector 100 may also be omitted in this embodiment. However, a disadvantage of this embodiment is that, owing to the curved configuration of the second contact element 210, a portion of the second contact surface 220 of the second contact element 210 that comes into contact with the first contact surface 120 of the first contact element 110 is significantly smaller than a portion of the first contact surface 120 of the first contact element 110 that comes into contact with the second contact surface 220 of the second contact element 210. A microstructuring of the second contact surface 220 of the second contact element 210 thereby brings about a less clear reduction of the insertion forces required to connect the plug type connectors 100, 200 than a microstructuring of the first contact surface 120 of the first contact element 110.

Figure 2:
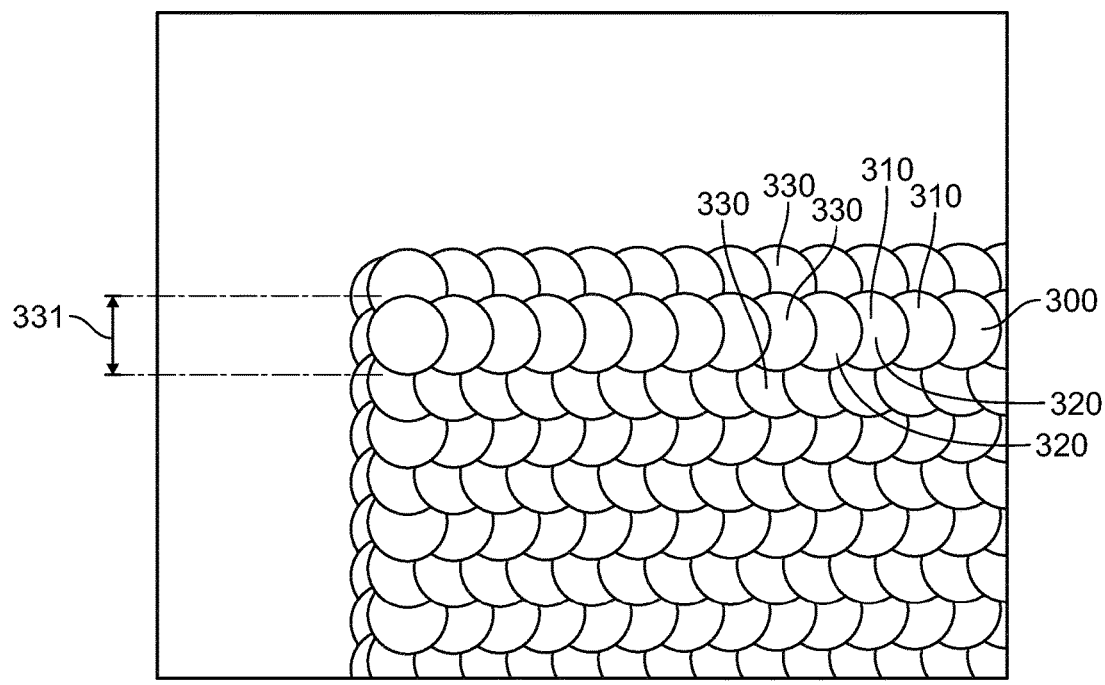
FIG. 2 is a plan view of a first microstructured contact surface.

FIG. 2 is a schematic view of a first microstructured contact surface 300. The microstructure 150 on the first contact surface 120 of the first contact element 110 of FIG. 1 may be constructed in an embodiment in the same manner as the first microstructured contact surface 300.

The first microstructured contact surface 300 has a plurality of scales 330 which are arranged regularly in a periodic manner. Mutually adjacent scales 330 partially overlap each other. Consequently, each of the scales 330 has raised and recessed regions. Portions of scales 330 which overlap adjacent scales 330 form projections 310. Portions of scales 330, which adjoin a region of the relevant scale 330 that is overlapped by an adjacent scale 330, form recesses 320. The projections 310 are higher than the recesses 320 in a direction perpendicular relative to the first microstructured contact surface 300. The height difference between the projections 310 and recesses 320 may be in the range between a few 100 nm and a few μm.

In a lateral direction of the first microstructured contact surface 300, the scales 330 have a scale size 331. The periodic structure of the first microstructured contact surface 300 formed by the scales 330 consequently has in at least one lateral spatial direction a periodic length which corresponds to the scale size 331. The scale size 331 is preferably in the range between 1 µm and 100 µm. In a particularly preferred manner, the scale size 331 is between 2 µm and 30 µm, quite particularly preferably in the range of approximately 10 µm.

Figure 3:
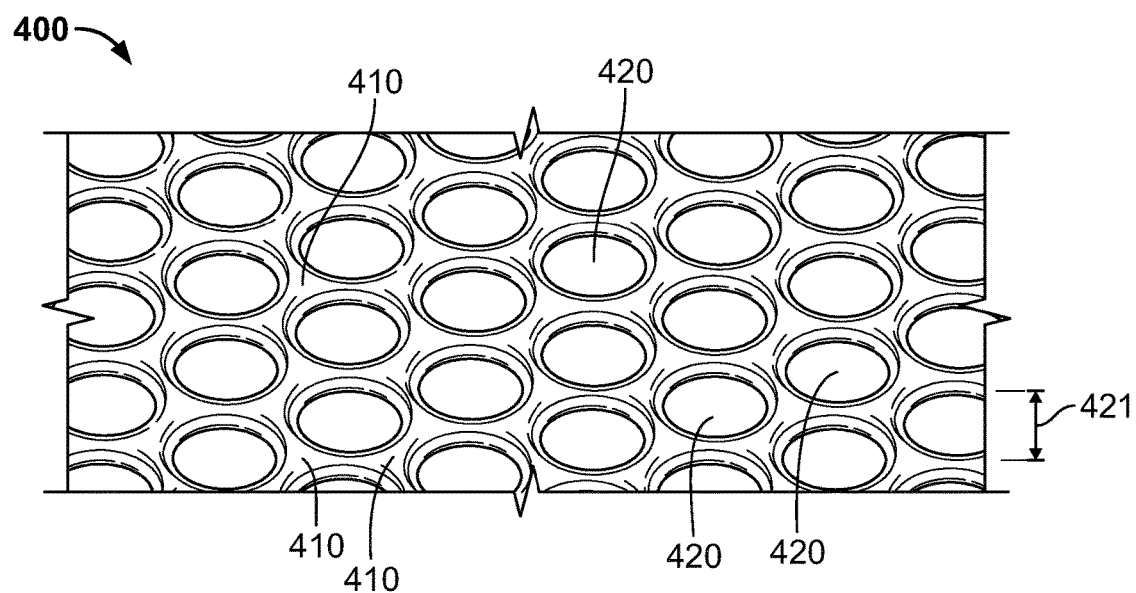
FIG. 3 is a plan view of a second microstructured contact surface.

FIG. 3 is a schematic view of an exemplary second microstructured contact surface 400. The microstructure 150 on the first contact surface 120 of the first contact element 110 of the first plug type connector 100 of FIG. 1 may be constructed in the same manner as the second microstructured contact surface 400.

The second microstructured contact surface 400 has a regular pattern with periodic projections 410 and recesses 420. The recesses 420 are constructed as circular-disc-like holes. The projections 410 are higher than the recesses 420 in the direction perpendicular relative to the second microstructured contact surface 400. In the plane of the second microstructured contact surface 400, two adjacent recesses 420 have in at least one spatial direction a hole spacing 421. Consequently, the periodic structure of the second microstructured contact surface 400 formed by the projections 410 and the recesses 420 has in at least one lateral spatial direction a periodic length which corresponds to the hole spacing 421. The hole spacing 421 is, for example, again in the region between 1 µm and 100 µm, preferably in the order of magnitude of from 2 µm to 30 µm, in a particularly preferred manner in the range of approximately 10 µm. The height of the projections 410 with respect to the recesses 420 in the direction perpendicular with respect to the second microstructured contact surface 400 may in turn be from a few 100 nm to a few µm.

Figure 4:
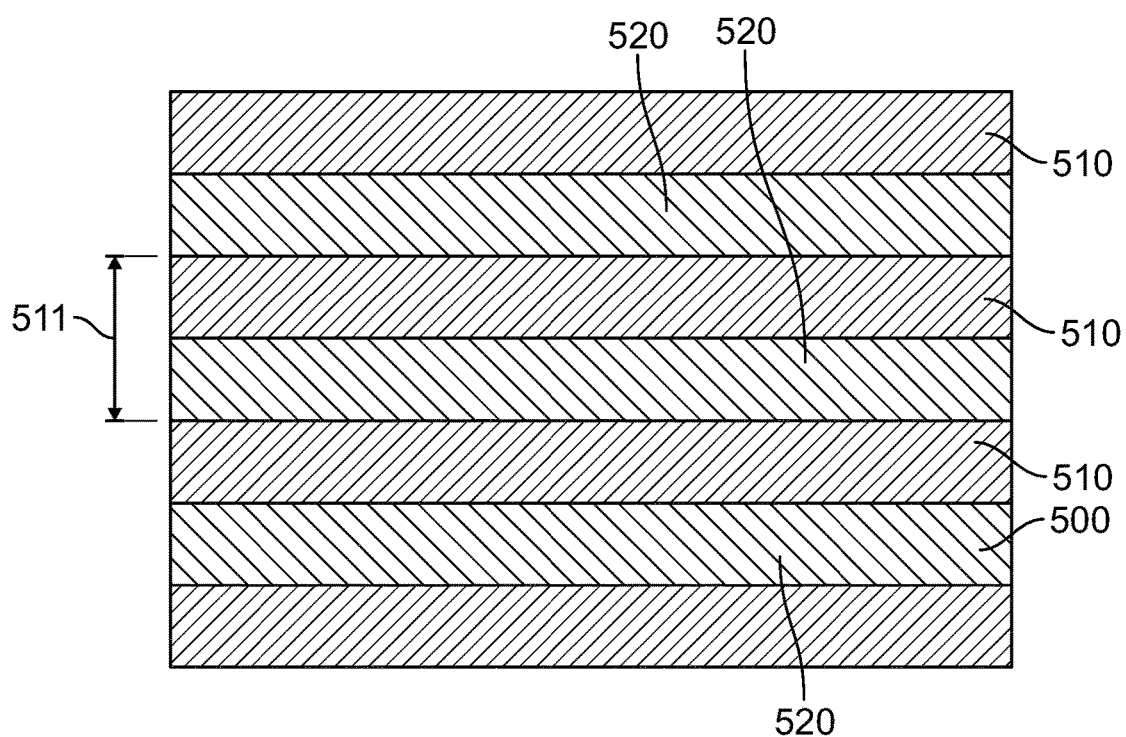
FIG. 4 is a plan view of a third microstructured contact surface.

FIG. 4 shows an exemplary third microstructured contact surface 500. The microstructure 150 on the first contact surface 120 of the first contact element 110 of the first plug type connector 100 of FIG. 1 can be constructed in the same manner as the third microstructured contact surface 500.

The third microstructured contact surface 500 has a regular periodic strip structure with mutually alternating indentations and protuberances. The protuberances form projections 510. The indentations form recesses 520. A recess 520 is arranged between two projections 510 in each case. A projection 510 is arranged between two recesses 520 in each case. Two successive recesses 520 have an indentation spacing 511 with respect to each other. The indentation spacing 511 preferably has a size between 1 µm and 100 µm, preferably a size in the range from 2 µm to 30 µm, in a particularly preferred manner in the range of approximately 10 µm. The protuberances or projections 510 may have the same width as the indentations or recesses 520. Indentations or recesses 520 may, however, also be constructed so as to be wider or narrower than the protuberances or projections 510. The height of the projections 510 with respect to the recesses 520 may be in the range between a few 100 nm and a few µm.

The extension direction of the projections 510 and the recesses 520 of the third microstructured contact surface 500 may be orientated parallel with or perpendicular to, or at any other angle with respect to, the first relative insertion direction 111 of the first contact element 110 of the first plug type connector 100.

The microstructure 150 on the first contact surface 120 of the first contact element 110 of the first plug type connector 100 may be constructed, for example, in the same manner as the first microstructured contact surface 300 of FIG. 2, in the same manner as the second microstructured contact surface 400 of FIG. 3 or in the same manner as the third microstructured contact surface 500 of FIG. 4. The microstructure 150 may, however, also be constructed differently. The microstructure 150 is preferably produced by the first contact surface 120 being microstructured using a laser or an electron beam. Advantageously, by using a laser or an electron beam, very large contact surfaces can be microstructured within an extremely short period of time.

The first contact surface 120 of the first contact element 110 may be provided with the microstructure 150 after the first contact element 110 has been produced.

Alternatively, however, the first contact element 110 may also have been produced from a strip material which has already been provided with the microstructure 150 beforehand. In this production method, for example, a strip of the base material 130 may first be provided with the coating 140 by means of hot-dip tinning. A surface of the coating 140 which later forms the first contact surface 120 is subsequently provided with the microstructure 150 by means of a laser or an electron beam. The first contact element 110 is subsequently produced from the strip material.

Owing to the presence of the microstructure 150 on the first contact surface 120 of the first contact element 110 of the first plug type connector 100, whilst the first plug type connector 100 is being connected to the second plug type connector 200, the support face between the first contact surface 120 of the first contact element 110 of the first plug type connector 100 and the second contact surface 220 of the second contact element 210 of the second plug type connector 200 is reduced. The insertion force required to connect the plug type connectors 100, 200 is thereby reduced. Furthermore, owing to the microstructure 150, whilst the plug type connectors 100, 200 are being connected, abrasion of tin and accumulation of tin (snow shovel effect) is reduced on the first contact surface 120. The insertion forces required to connect the plug type connectors 100, 200 are also thereby reduced.

During the application of the coating 140, which may, for example, comprise tin, to the base material 130 which may, for example, comprise copper, intermetallic phases are partially formed from a combination of the base material 130 with the material of the coating 140 and have a higher hardness than the material of the coating 140. This applies in particular when the coating 140 is applied to the base material 130 by means of hot-dip tinning. During the production of the microstructure 150, the harder intermetallic phases partially reach the first contact surface 120. This results in the first contact surface 120 of the first contact element 110 sliding better on the second contact surface 220 of the second contact element 210. The insertion forces required to connect the plug type connectors 100, 200 are also thereby reduced. The material of the coating 140 (for example, tin) remaining on the first contact surface after the microstructuring of the first contact surface 120 further acts, during the connection of the plug type connectors 100, 200, as a lubricant which causes the second contact surface 220 of the second contact element 210 to slide more readily over the first contact surface 120 of the first contact element 110. The insertion forces required to connect the plug type connectors 100, 200 are also thereby reduced.

The recesses 320, 420, 520 formed in the microstructure 150 on the first contact surface 120 can also be used to receive an additional lubricant. This lubricant may be introduced into the recesses 320, 420, 520, for example, by being painted on the first contact surface 120 provided with the microstructure 150. The lubricant may have, for example, oil, grease, a paste or a solid-state lubricant such as graphite, CNT, Graphene MoS2 and admixtures thereof. The lubricant arranged in the recesses 320, 420, 520 results in the second contact surface 220 of the second contact element 210 sliding more readily over the first contact surface 120 of the first contact element 110 when the plug type connectors 100, 200 are connected, whereby the insertion forces required for connection are further reduced.

The microstructure 150 arranged on the first contact surface 120 further results in the number of the contact locations between the first contact surface 120 and the second contact surface 220 increasing when the plug type connectors 100, 200 are connected. This is because even a contact surface which is not provided with a microstructure is not level on a microscopic scale. Owing to the increased number of contact locations between the second contact surface 220 of the second contact element 210 and the first contact surface 120 of the first contact element 110, an electrical transition resistance between the first contact element 110 and the second contact element 210 is reduced. It has been found in experiments that the reduction of the transition resistance is particularly clear when the microstructure 150 on the first contact surface 120 of the first contact element 110 is constructed in the same manner as the third microstructured contact surface 500 of FIG. 4.

The invention claimed is:

1. An electrical plug type connector having an electrically conductive contact element having a base material and a coating positioned on the base material, the coating defining a contact surface of the contact element, wherein the contact surface is comprised of an electrically conductive material having a microstructure forming an at least partially periodic structure, the microstructure having a scale-like structure defining the at least partially periodic structure, and wherein the scale-like structure includes a plurality of three-dimensional scales, and each of the scales overlaps an adjacent scale.

2. An electrical plug type connector according to claim 1, the contact surface having tin or silver or an alloy of tin or silver.

3. An electrical plug type connector according to claim 2, the contact element comprises copper or a copper alloy and being tin-coated or silver-coated or coated with a tin/silver alloy.

4. An electrical plug type connector according to claim 1, the contact surface having projections and recesses.

5. An electrical plug type connector according to claim 4, a lubricant being arranged in at least one recess.

6. An electrical plug type connector according to claim 1, the periodic structure in at least one direction having a periodic length in the range between 1 μm and 100 μm.

7. An electrical plug type connector according to claim 1, the microstructure being produced by means of a laser or electron beam processing operation of the contact surface.

8. An electrical plug type connector according to claim 1, the contact element being a contact pin.

9. An electrical plug type connector according to claim 1, the contact element being a contact spring.

10. An electrical plug type connector according to claim 1, the plug type connector having a plurality of contact elements.

11. An electrical plug type connector according to claim 1 wherein each of the scales has a circular shape.

12. An electrical plug type connector according to claim 1, wherein a projection is defined between overlapped portions of adjacent scales.

\* \* \* \* \*